(12) United States Patent
Rupp

(10) Patent No.: US 10,555,546 B2
(45) Date of Patent: Feb. 11, 2020

(54) BLADE FOR SHAVING ICE

(71) Applicant: Snowie LLC, Salt Lake City, UT (US)

(72) Inventor: Carl A. Rupp, Salt Lake City, UT (US)

(73) Assignee: Snowie LLC, Salt Lake City, UT (US)

( * ) Notice: Subject to any disclaimer, the term of this patent is extended or adjusted under 35 U.S.C. 154(b) by 905 days.

(21) Appl. No.: 14/729,003

(22) Filed: Jun. 2, 2015

(65) Prior Publication Data

US 2015/0342218 A1 Dec. 3, 2015

Related U.S. Application Data

(63) Continuation-in-part of application No. 14/520,254, filed on Oct. 21, 2014.

(60) Provisional application No. 62/006,741, filed on Jun. 2, 2014, provisional application No. 61/893,658, filed on Oct. 21, 2013.

(51) Int. Cl.
*A23G 9/28* (2006.01)
*A23G 9/04* (2006.01)
*B02C 18/22* (2006.01)

(52) U.S. Cl.
CPC ........... *A23G 9/28* (2013.01); *A23G 9/045* (2013.01); *B02C 18/2216* (2013.01); *B02C 18/2291* (2013.01)

(58) Field of Classification Search
CPC ...... A23G 9/28; A23G 9/045; B02C 18/2216; B02C 18/2291; F25C 5/02; F25C 5/12; A47J 43/046; A47J 43/25
USPC ........ 241/191, 101.2, DIG. 17; 62/342, 345, 62/346, 354
See application file for complete search history.

(56) References Cited

U.S. PATENT DOCUMENTS

| | | | |
|---|---|---|---|
| 2,341,665 A * | 2/1944 | Scully | B26B 19/16 30/346.51 |
| 2,539,734 A | 1/1951 | Echols et al. | |
| 3,552,663 A * | 1/1971 | Royals | A23G 9/045 241/278.1 |
| 3,976,806 A | 8/1976 | Ziccarelli | |
| 4,113,190 A * | 9/1978 | Fudman | B02C 18/12 241/92 |
| 4,681,030 A * | 7/1987 | Herbert | A23G 9/045 366/144 |
| 4,718,610 A | 1/1988 | Gallaher | |
| 4,733,827 A * | 3/1988 | Williams | A47J 43/07 206/373 |
| 5,619,901 A * | 4/1997 | Reese | A23G 9/045 222/132 |
| 6,216,968 B1 * | 4/2001 | Karkos, Jr. | A23G 9/045 241/101.2 |
| 6,527,212 B2 | 3/2003 | Rupp | |
| 6,553,779 B1 * | 4/2003 | Boyer | A23G 9/045 222/146.6 |
| 6,814,323 B2 * | 11/2004 | Starr | A47J 43/046 241/282.2 |
| 6,908,053 B2 * | 6/2005 | Rupp | A23G 9/045 241/86.1 |

(Continued)

*Primary Examiner* — Shelley M Self
*Assistant Examiner* — Smith Oberto Bapthelus
(74) *Attorney, Agent, or Firm* — Terrence J. Edwards; TechLaw Ventures, PLLC

(57) ABSTRACT

The disclosure extends and relates to devices, systems and methods for shaving ice with an improved blade to produce a powdery snow-like textured confection.

21 Claims, 13 Drawing Sheets

(56) References Cited

U.S. PATENT DOCUMENTS

| | | | | |
|---|---|---|---|---|
| 2003/0035693 A1* | 2/2003 | Chalfant | ............ | A47J 43/25 407/29.1 |
| 2006/0075872 A1* | 4/2006 | Wangler | ............ | B26D 3/283 83/856 |
| 2006/0186238 A1* | 8/2006 | Swegle | ............ | A23G 9/045 241/277 |
| 2007/0119995 A1* | 5/2007 | Yamanaka | ............ | A47J 43/25 241/95 |

* cited by examiner

BLADE FOR SHAVING ICE

CROSS-REFERENCE TO RELATED APPLICATIONS

This application claims the benefit of U.S. Provisional Application No. 62/006,741, filed Jun. 2, 2014, entitled "Portable Frozen Confection Machine," which is hereby incorporated by reference herein in its entirety, including but not limited to those portions that specifically appear hereinafter, the incorporation by reference being made with the following exception: In the event that any portion of the above-referenced application is inconsistent with this application, this application supersedes said portion of said above-referenced application.

This application is also a continuation-in-part of U.S. patent application Ser. No. 14/520,254, entitled "Portable Frozen Confection Machine" filed on Oct. 21, 2014, which claims the benefit of U.S. Provisional Application No. 61/893,658, filed Oct. 21, 2013, entitled "Portable Frozen Confection Machine," and also claims the benefit of U.S. Provisional Application No. 62/006,741, filed Jun. 2, 2014, entitled "Portable Frozen Confection Machine," which are hereby incorporated by reference herein in their entirety, including but not limited to those portions that specifically appear hereinafter, the incorporation by reference being made with the following exception: In the event that any portion of the above-referenced applications is inconsistent with this application, this application supersedes said portion of said above-referenced applications.

STATEMENT REGARDING FEDERALLY SPONSORED RESEARCH AND DEVELOPMENT

Not Applicable.

BACKGROUND

The disclosure relates generally to ice shaving machines, systems, and methods and more particularly, but not necessarily entirely, to ice shaving machines, systems, and methods for shaving ice, such as cubed or other ice, with an improved blade to produce a powdery snow-like textured confection.

A variety of machines have been developed, described and are widely known for creating or processing cold deserts and confectioneries by processing ice into more appealing eatable forms, such as snow cones and shaved ice products. Such devices produce either ice granules (snow cones) or light, fluffy, finely textured shaved ice for subsequent flavoring using syrups.

Despite the advantages of shaved ice machines that are available in the marketplace, improvements are still being sought. Shaved ice machines in the marketplace may be characterized by several disadvantages that may be addressed by the disclosure.

The features and advantages of the disclosure will be set forth in the description which follows, and in part will be apparent from the description, or may be learned by the practice of the disclosure without undue experimentation and are readily apparent to those of ordinary skill in the art upon review of the following drawings, detailed description, claims and abstract of this disclosure. The features and advantages of the disclosure may be realized and obtained by means of the instruments and combinations particularly pointed out in the appended claims.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood with regard to the following description and accompanying drawings where.

DETAILED DESCRIPTION

Figure 1:
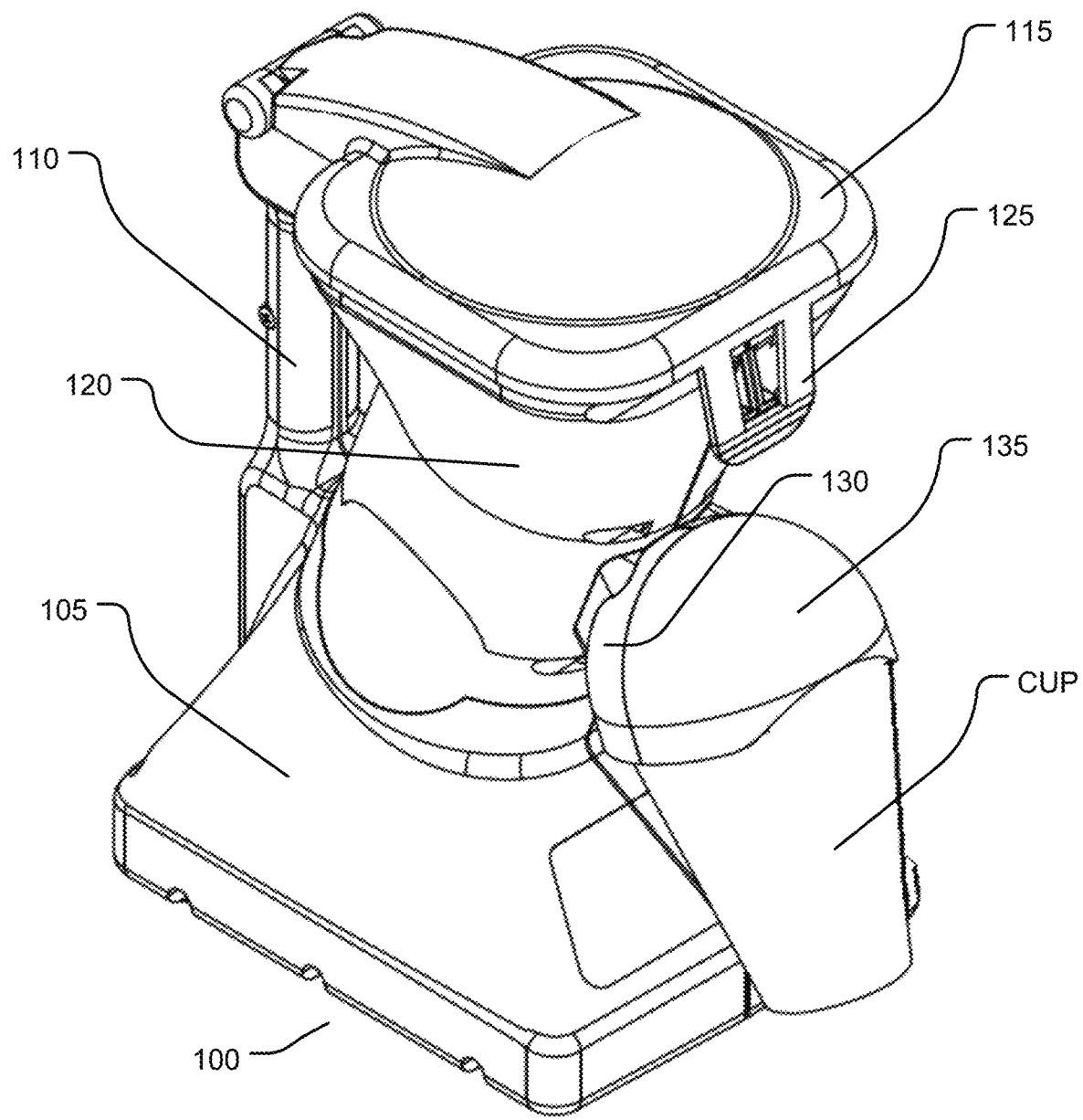
FIG. 1 illustrates an embodiment of a portable frozen confection machine in accordance with the teachings and principles of the disclosure.

The disclosure extends to apparatuses, methods, and systems, for producing frozen confections and conditioning ice for use in frozen confections. The features and advantages of the disclosure will be set forth in the description which follows, and in part will be apparent from the description, or may be learned by the practice of the disclosure without undue experimentation. The features and advantages of the disclosure may be realized and obtained by means of the instruments and combinations particularly pointed out in the appended claims.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

Before the structure, systems and methods for producing frozen confections are disclosed and described, it is to be understood that this disclosure is not limited to the particular structures, configurations, process steps, and materials disclosed herein as such structures, configurations, process steps, and materials may vary somewhat. It is also to be understood that the terminology employed herein is used for the purpose of describing particular embodiments only and is not intended to be limiting since the scope of the disclosure will be limited only by the appended claims and equivalents thereof.

In describing and claiming the subject matter of the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

As used herein, the phrase "consisting of" and grammatical equivalents thereof exclude any element or step not specified in the claim.

As used herein, the phrase "consisting essentially of" and grammatical equivalents thereof limit the scope of a claim to the specified materials or steps and those that do not materially affect the basic and novel characteristic or characteristics of the claimed disclosure.

The disclosure relates to an ice shaving machine for receiving ice and thinly slicing or shaving the ice with a blade to produce a powdery snow-like textured confection. The ice may be received in a hopper, which permits the ice to come into contact with a blade. It will be appreciated that the blade shaves off paper-thin slices of ice. A scraper may be used to collect the paper-thin slices of ice and move the shaved ice to a spout, under which a container may be placed to receive the shaved, slices of ice. Once the container is sufficiently full of shaved ice flavorings may be added. It will be appreciated that flavorings may be added through any flavor dispensing system, whether a stand-alone flavor dispensing system or a flavoring dispensing system that is integrated into another system.

Referring now to the figures, FIG. 1 illustrates an implementation of a frozen confection machine 100 that is configured to be portable. As can be seen in the figure the machine 100 for conditioning ice may comprise a body portion having a housing 105 and a handle portion 110 for convenient portability and positioning. The machine may further comprise a hopper 120 for receiving the ice to be conditioned. In an implementation the handle portion 110 may comprise a rubber material for providing grip for moving and holding the machine 100. The machine 100 may further comprise a lid 115 configured to cover the hopper 120. It will be appreciated that the lid 115 may comprise a transparent portion for monitoring ice in the hopper portion. The lid 115 may further have a catch 125 mechanism, such that when the catch is released 125, the lid 115 is allowed to rotate into an open position, such that ice may be introduced into the hopper 120 of the machine 100. In an embodiment, the lid 115 may be made of a clear material to provide the user the ability to see the ice level in the hopper. Additionally, the machine may comprise a spout 130 and ice shaper 135 for delivering and shaping the conditioned ice into a cup or other container for receiving the shaved ice product. It should be noted that the body 105, lid 115, spout 130 and shaper 135 may be made from any suitable material such as for example: plastics and metals.

Figure 2:
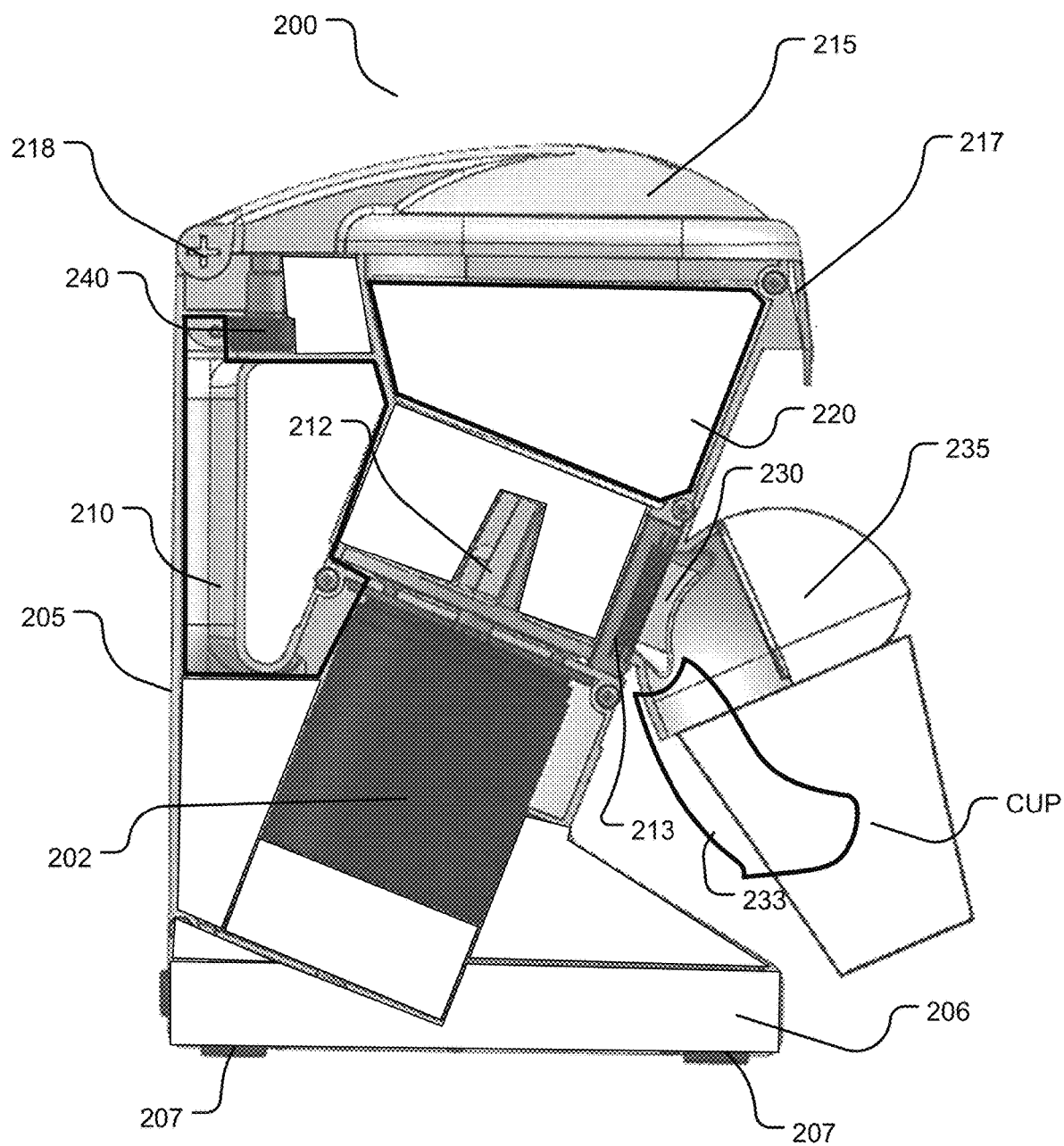
FIG. 2 illustrates a cutaway view of an embodiment of a portable frozen confection machine in accordance with the teachings and principles of the disclosure.

FIG. 2 illustrates a cutaway view of a frozen confection machine 200. As can be seen in the figure, a motor 202 may be disposed within the housing 205 of the machine 200. The motor 202 may be electric and may be driven by DC or AC current. An embodiment having a DC motor may be driven by a battery that may also be disposed within the housing. The housing 205 may comprise a base portion 206 that is sized and shaped to provide stability during use. The base portion 206 may comprise feet 207 that provide traction and may be made from a vibration dampening material to reduce noise and vibration during use.

As also illustrated in the figure, the machine 200 may comprise a handle portion 210 that is configured to fit a user's hand for easy portability. The handle portion 210 may be aligned and configured so as to be held by a user during ice conditioning to compensate for forces generated by the motor 202 and the paddle 212 while conditioning the ice.

In an embodiment, the motor 202 may be directly connected to a drive shaft that drives the paddle 212 thereby moving ice into a blade 213. It should be noted that in an embodiment the motor 202 may drive a blade that spins in order to condition the ice. The motor 202 may be disposed within the housing 205, such that the motor's axis of rotation is generally aligned with the body of the machine 200. Additionally, the axis of rotation of the paddle 212 may also be generally aligned with the body of the machine 200. In an embodiment the housing 205 may further comprise a door for easily accessing the blade for maintenance.

An embodiment may comprise a motor that is indirectly connected to paddle wheel through a device with a transmission or gearing.

As can be seen in the figure, the machine may comprise a hopper 220 for receiving the unconditioned ice, and may comprise a spout portion 230 for dispensing the conditioned ice after being processed and moved throughout a portion the body of the machine 200. The spout 230 may be configured to deliver conditioned ice into a shaper 235 for providing a shaped top for the conditioned ice within a cup or container. In an implementation, and additional flexible hand shaping flap 233 may be included, which allows users more options for shaping during use without having to come into contact with the edible conditioned ice product. The flexible shaping flap may be attached near the spout as illustrated.

A lid 215 may be provided for covering the hopper 220. The lid 215 may comprise a latch 217 for locking the lid 215 in a predetermined position. Additionally, the lid 215 may be configured so as to operate a switch 240 that turns on the motor so that the machine may not be operated without the lid 215 in place, or locked in place by the latch 217. The lid may be hinged 218 relative to the body of the machine 200 so that it rotates between open and closed positions.

For example, during use the machine 200 may be positioned on a work surface by a user by way of the handle 210. The user may then lift the lid 215 to expose the hopper 220, and ice may then be introduced into the hopper 220. The lid 215 may then be closed and held down by the latch 217 or other mechanism thereby actuating the switch 240 to turn on the motor 202. The motor 202 then turns the paddle 212 to drive ice into the blade 213. The ice is conditioned as it moves through the blade 213 and into the spout 230 and shaper 235. The conditioned ice may then be delivered to a cup, or other container as may be desired by a user, and shaped by the shaper 235, and the flexible hand shaper 233, resulting in cup or container full of conditioned ice or product, which may have a pleasingly shaped top.

In an implementation, an external switch may be provided for actuating the machine. For example the external switch may be a foot pedal or other switch for actuating the machine.

Figure 3:
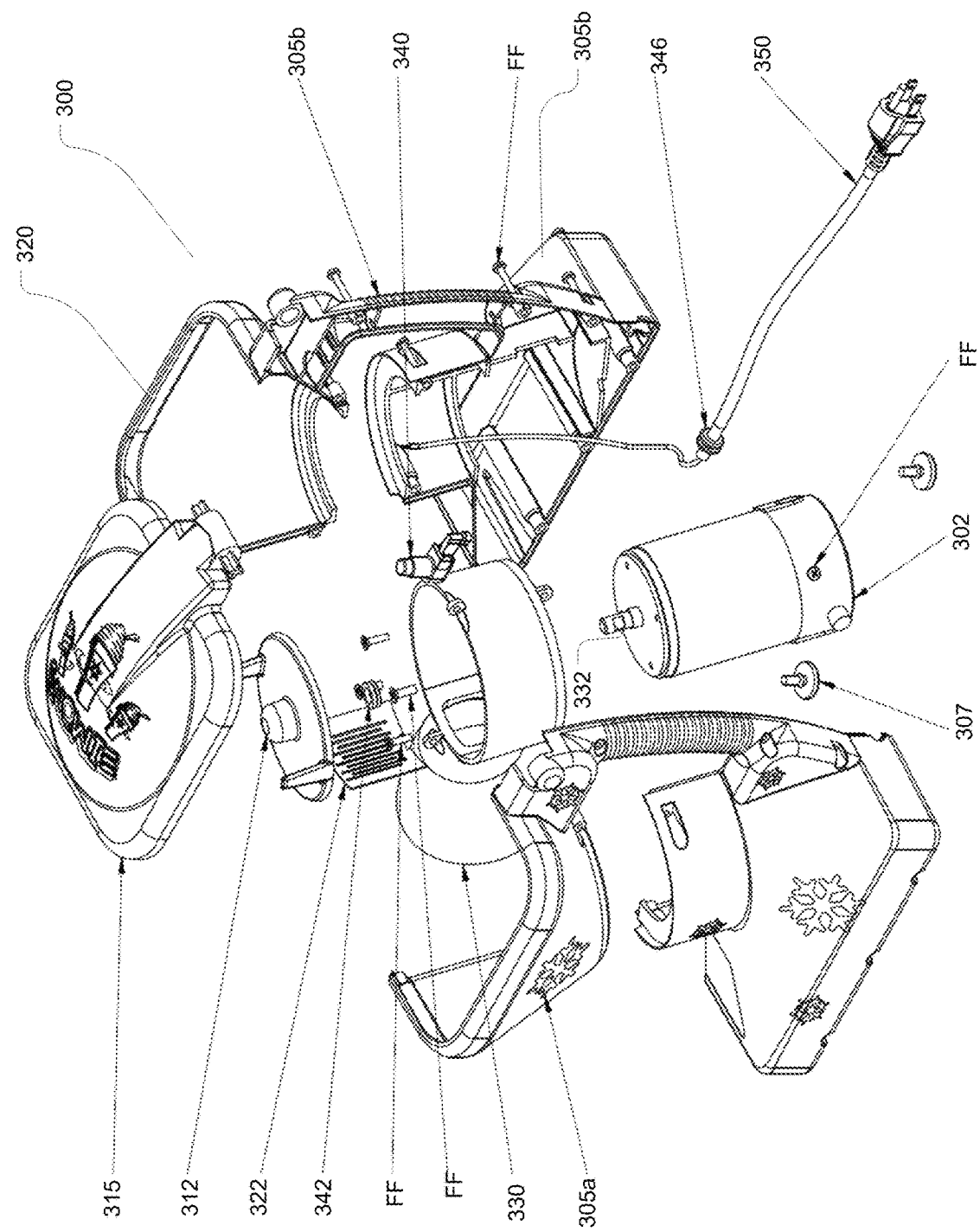
FIG. 3 illustrates an exploded view of an embodiment of a portable frozen confection machine in accordance with the teachings and principles of the disclosure.

FIG. 3 illustrates an exploded view of a frozen confection machine 300. The machine may be constructed primarily of two housing halves 305a and 305b that may be joined together to thereby hold a motor 302, paddle wheel 312, and blade 322 in a working configuration relative to each other. As can be seen in the figure, a motor 302 may be disposed within the housing 305 of the machine 300. The housing halves 305a and 305b may comprise a base portion that is sized and shaped to provide stability during use. The base portion may comprise feet 307 that provide traction and may be made from a vibration dampening material to reduce noise and vibration during use.

As also illustrated in the figure, the machine 300 may comprise a handle portion that is configured to fit a user's hand for easy portability. The handle portion may be aligned and configured so as to be held by a user during ice conditioning to compensate for forces generated by the motor 302 and the paddle 312 while conditioning the ice.

In an embodiment the motor 302 may be directly connected to a drive shaft 332 that drives the paddle 312 thereby moving ice into a blade 322. It should be noted that in an embodiment the drive shaft 332 may be connected to the paddle 312 with a shaft connector 342. The motor 302 may be disposed within the housing 305a-b such that the motor's axis of rotation is generally aligned with the body of the machine 300. Additionally, the axis of rotation of the paddle 312 may also be generally aligned with the body of the machine 300. In an embodiment, the housing may further comprise a door for easily accessing the blade for maintenance.

As can be seen in the figure, the machine may comprise a hopper 320 for receiving the unconditioned ice, and may comprise a spout portion 330 for dispensing the conditioned ice after being processed and moved throughout a portion the body of the machine 300. The spout 330 may be configured to deliver conditioned ice into a shaper 335 for providing a shaped top for the conditioned ice within a cup or container.

A lid 315 may be provided for covering the hopper 320. The lid 315 may comprise a latch for locking the lid in a predetermined position. Additionally, the lid 315 may be configured so as to operate a switch 340 that turns on the motor so that the machine 300 may not be operated without the lid 315 in place. Additionally, a power cord 350 may be provided to power the machine 300. Various fasteners FF may be used to mount the various components of the machine together. Foot pads 344 may be used to dampen vibrations created during use. Rubber grommets 346 may be used to seal opening in the housing of the machine.

As can be seen in the figure, an embodiment may comprise drive shaft 332 that is directly connected to and directly drives the paddle 312.

Figure 4:
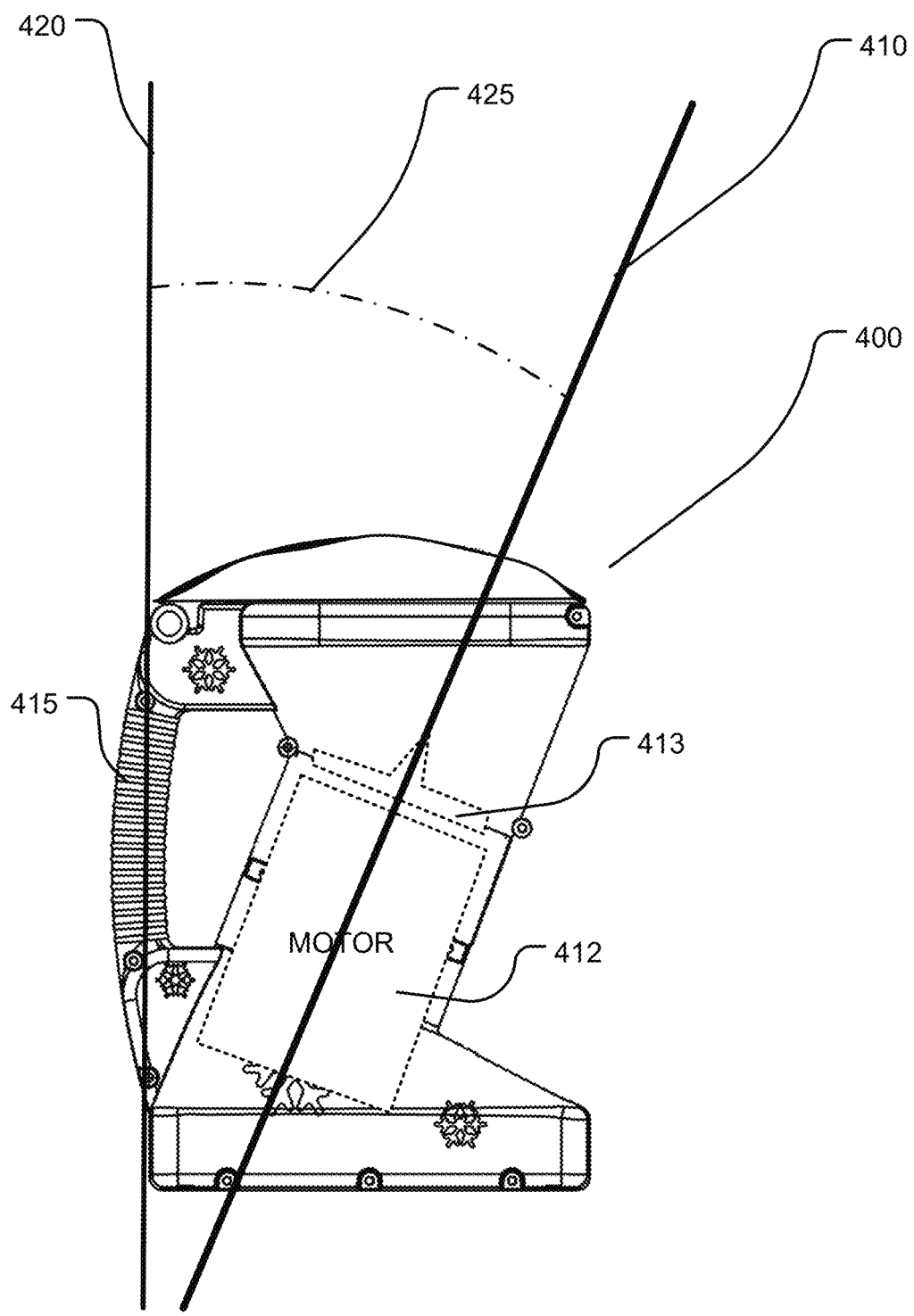
FIG. 4 illustrates an embodiment of a portable frozen confection machine illustrating its configuration angles in accordance with the teachings and principles of the disclosure.

FIG. 4 illustrates an embodiment that emphasizes the angle between a handle portion and the axis of rotation of the motor 412 and paddle 413. Illustrated in the figure is a frozen confection machine 400 having an angle 425 between a first line 420 drawn through the handle portion 415 and generally aligned with the base portion of the machine and a second line 410 that represents the axis of rotation of the motor 412. The angle 425 formed by the intersection of the first line 420 and the second line 410 may be chosen during design to dampen or otherwise negate forces generated by the motor 412 and the paddle 413 as the machine processes ice. In an embodiment, the motor may be disposed within the housing, such that the drive shaft of the motor rotates about an axis 410 that is fixed at an angle relative to the handle 415. It will be appreciated that in an embodiment, the angle 425 may be selected from a range of between about 30 degrees to about 60 degrees. In an embodiment, the angle may be selected from a range of about 40 degrees to about 50 degrees. In use, a user may grasp the handle 415 to steady the machine during use.

Figure 5:
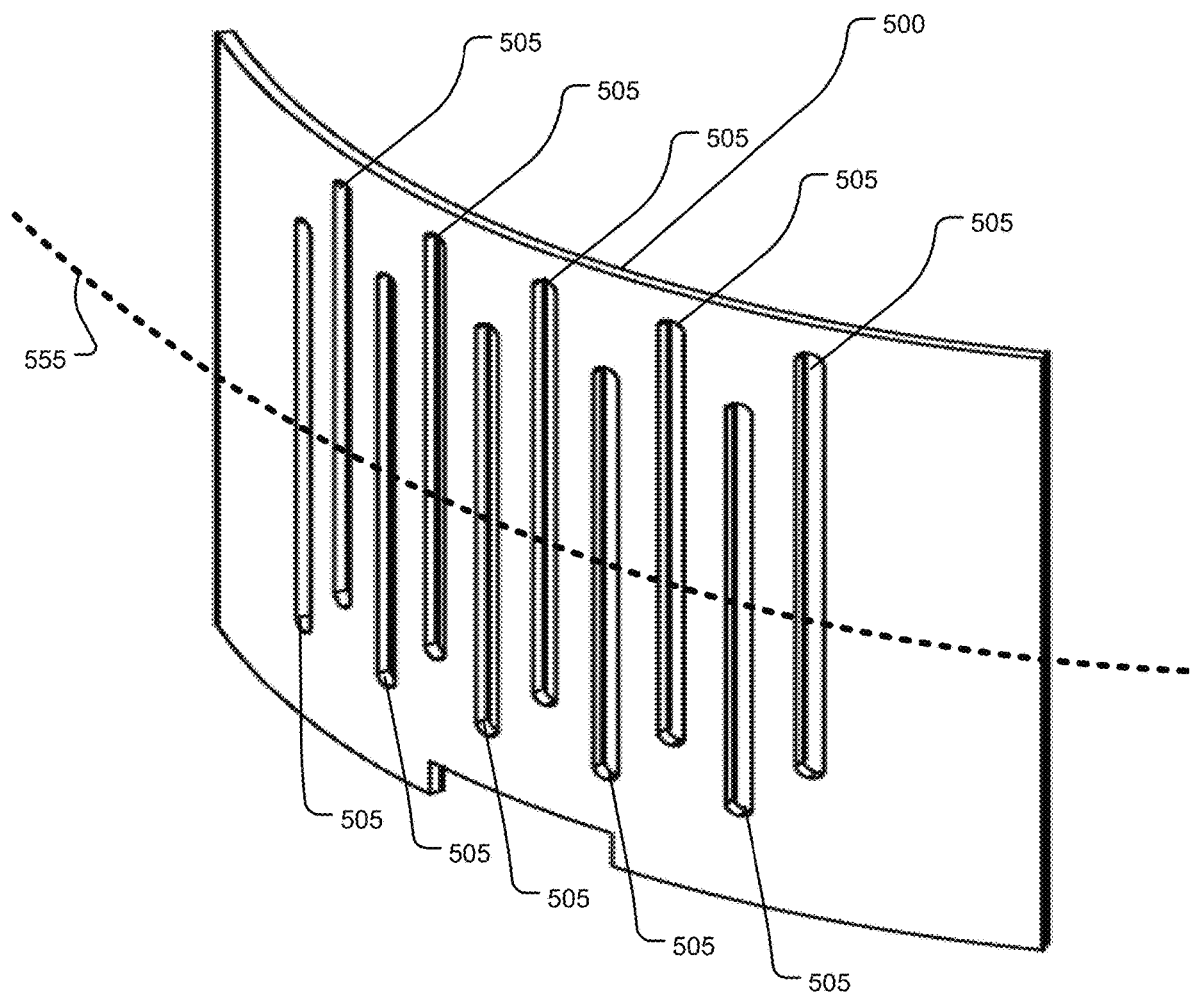
FIG. 5 illustrates an embodiment of a blade for a frozen confection machine in accordance with the teachings and principles of the disclosure.

FIG. 5 illustrates an embodiment of a blade 500 configured for conditioning ice as it is dispensed to a user. Those in the art will know that when processing ice, ice buildup on equipment is a problem with current prior art systems. Illustrated in the figure is an embodiment of a blade 500 that resists ice buildup while providing conditioned ice suitable for confectionary use. As illustrated, a blade 500 may be arched or arcuate and may comprise a plurality of teeth 505. The teeth 505 may be configured as slots in the blade 500 that allow conditioned ice to form on a first side of the blade and pass through the blade 500 to a second side. In an embodiment, the teeth 505 may be uniform and placed regularly about the blade 500. It will be appreciated that in an embodiment the blade 500 may comprise a plurality of offset teeth 505 relative to each other. The plurality of teeth 505 may be offset in an alternating pattern. Additionally, the teeth 505 may be situated on the blade in a pattern as is illustrated in the figure. As can be seen in the figure, the teeth 505 alternate between an up position and down position relative to a center line 555, which is shown as a dashed line in the figure. This may be done to reduce icing on the teeth 505 of the blade 500. It will be appreciated that any pattern may be employed, for example, three teeth in a row may be placed in a down position relative to the centerline 555, while next three teeth are placed in an up position relative to the centerline 555. The pattern may repeat as many times as desired. It will be appreciated that any number of teeth may be placed in an up position and any number of teeth may be placed in a down position with respect to the centerline 555 without departing from the scope of the disclosure.

Figure 6:
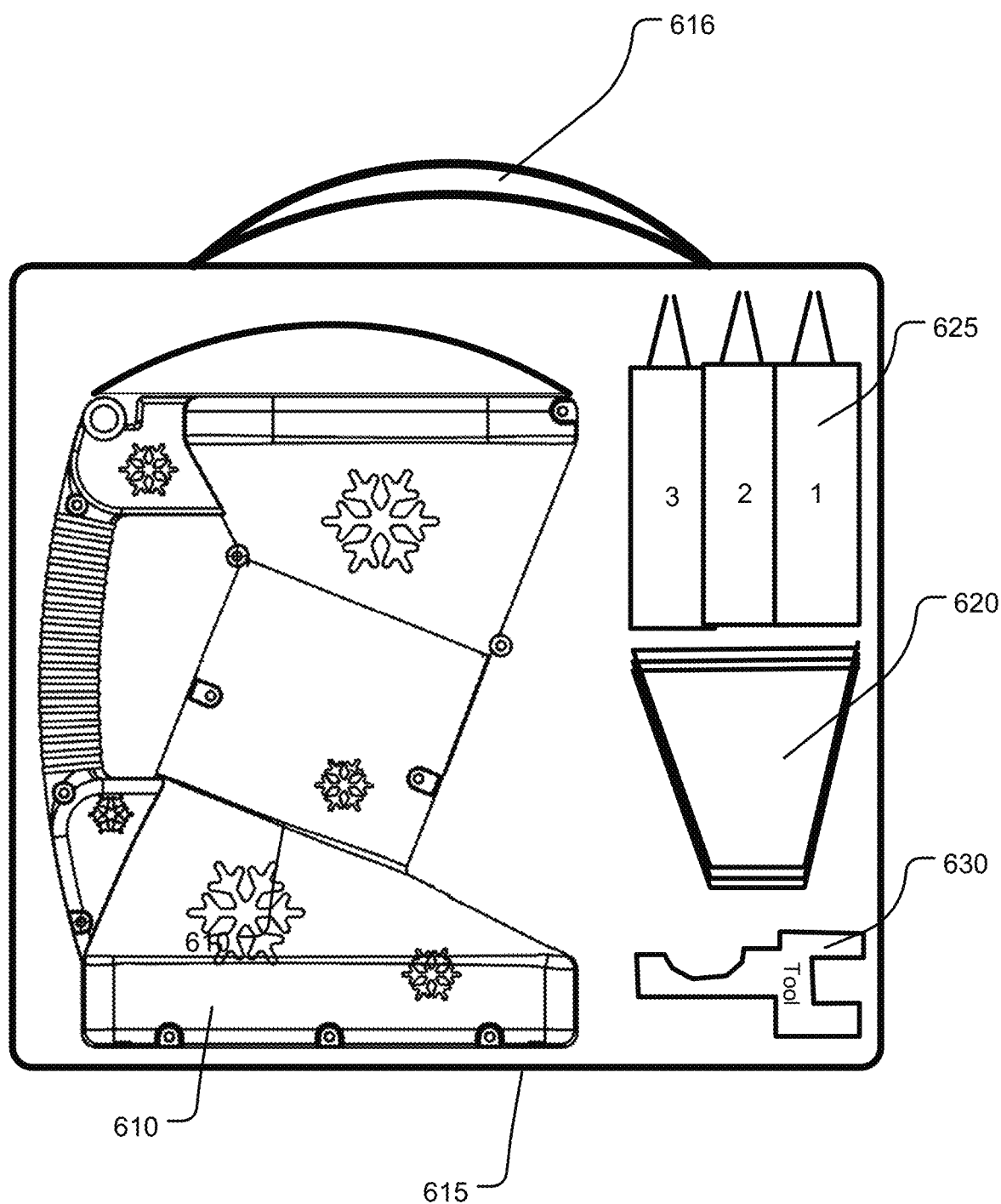
FIG. 6 illustrates an embodiment of a kit that includes a portable frozen confection machine in accordance with the teachings and principles of the disclosure.

FIG. 6 illustrates an embodiment of a kit 600 comprising a frozen confection making system that comprises an ice conditioning machine 610 and a carrying case 615. The case 615 may comprise a carrying handle 616. Additionally, a kit 600 may comprise cups 620 and/or topping containers 625, which may be used to dispense flavors for the conditioned ice, for serving the conditioned ice and creating the frozen confections. Additionally, a kit 600 may comprise additional items such as a power cord, battery and backup battery. An embodiment of a kit may include a tool 630 that is specially configured for maintaining the ice conditioning machine 610.

Figure 7:
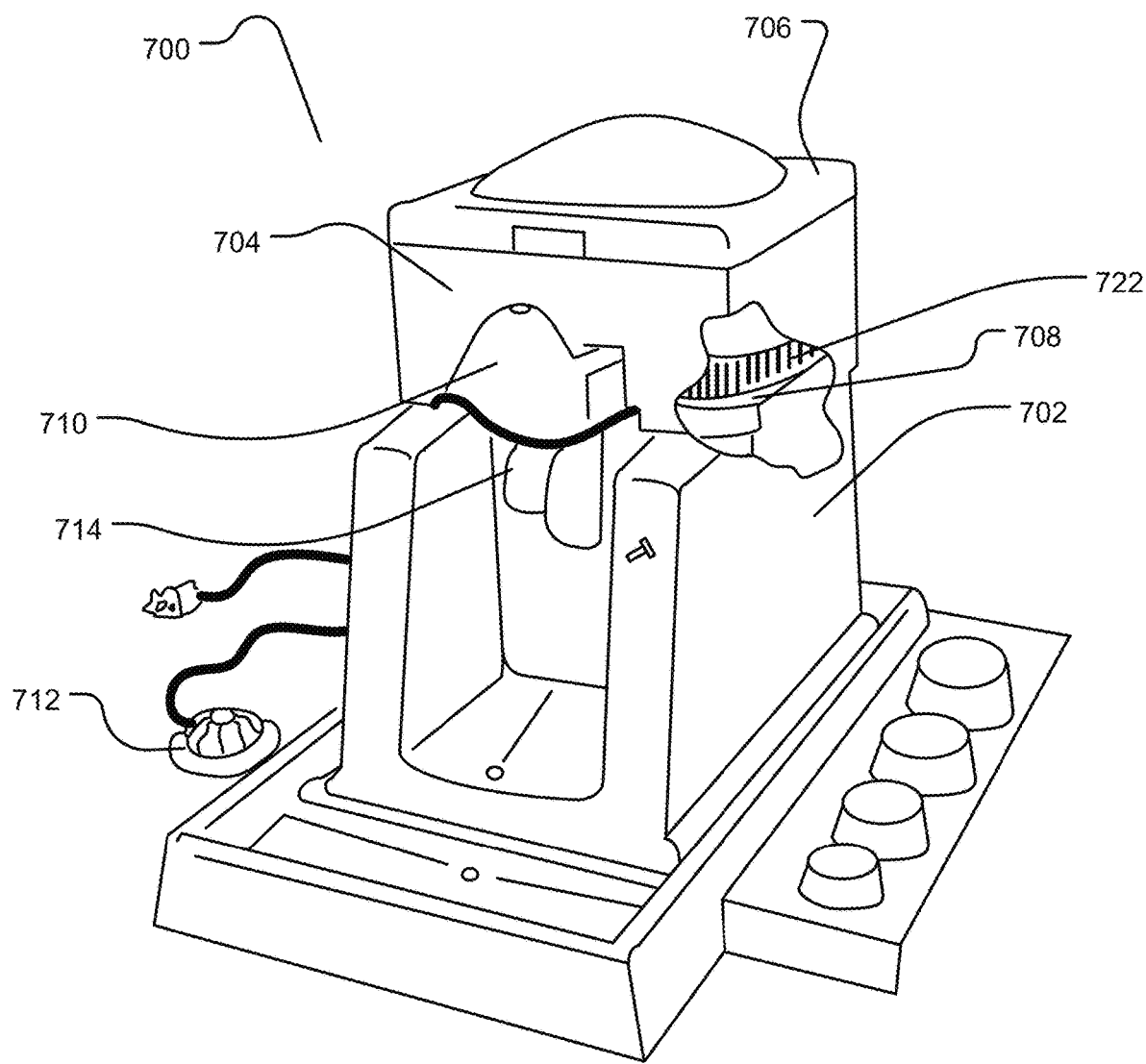
FIG. 7 illustrates an embodiment of a frozen confection machine in accordance with the teachings and principles of the disclosure.

Referring now to FIG. 7, there is illustrated a perspective view of an embodiment of a system for shaving ice. The system may be referred to as a frozen confection machine or an ice shaving machine 700. The machine 700 is shown having a cabinet 702 comprising a hopper 704, a lid 706 configured for covering the hopper portion 704, an ice scraper 708 (illustrated best in FIG. 9) comprising a plurality of paddles for moving ice into the blade, a spout assembly 710, and a switch 712. It will be appreciated that various components of the cabinet 702 may be made from a single material or more than one material, including stainless steel, a light-weight fiberglass material, or a hard plastic material without departing from the teachings of the disclosure, for durability and ease of cleaning. It will be appreciated that the lid 706 may be made from a transparent material or may have a transparent portion for monitoring ice in the hopper portion 704. It will be appreciated that the hopper 704 may be part of or attached to the cabinet 702 as illustrated.

The blade may be a stationary, arcuate blade 722 that may be fixed relative to the cabinet 702 as illustrated in FIGS. 7 and 14. The arcuate blade 722 may comprise a plurality of slots adjacent to a plurality of corresponding teeth 705. It will be appreciated that at least one of the plurality of corresponding teeth 705 may be offset relative to the other teeth 705 and offset relative to a centerline of the arcuate blade 722 as discussed more fully herein. The arcuate blade 722 may be disposed within the cabinet 702, as illustrated, between the hopper 704 and the spout 710.

A drive motor may be disposed within the cabinet 702. The system may comprise a control mechanism for activating and deactivating said drive motor, which may be in the form of switch 712. The switch may be a foot pedal or other on/off switch without departing from the scope of the disclosure.

The spout assembly 710 may be configured for dispensing conditioned ice and may operate in connection with the scraper 708, which may be mechanically connected to the drive motor, such that when the drive motor is activated the scraper 708 rotates and scrapes ice against the arcuate blade to thereby condition the ice.

The system may further comprise a flexible shaping flap 714 that is attached near the spout of the spout assembly 710.

Continuing to refer to FIG. 7, as noted above, the hopper 704 may be attached to the top of the cabinet 702 for receiving ice therein. It will be appreciated that the hopper 704 may be composed of a generally clear plastic material. The lid 706 may be mounted to the hopper 704 and pivotally fastened thereto. A switch 712 may be provided at the lid 706-hopper 704 connection to shut off the operation of the machine 700 when the lid 706 is raised. The scraper 708 may comprise a plurality of paddles, which may operate to contact the ice and push the ice across the blade and collect the shavings. The scraper 708 may operate to continuously move the ice across the blade, freeing flakes or shavings of ice, which are received by the spout 710. The blade 722 may be slotted with many slots. Each slot has an edge slightly bent upwards toward the direction of the received ice. The blade may be made of high quality stainless steel to maximize the blade life. The shaved ice falls through the spout 710 where it is received in a container or cup (illustrated best in FIG. 1). Once a sufficient quantity of ice is collected in the container, flavoring may be added.

Figure 8:
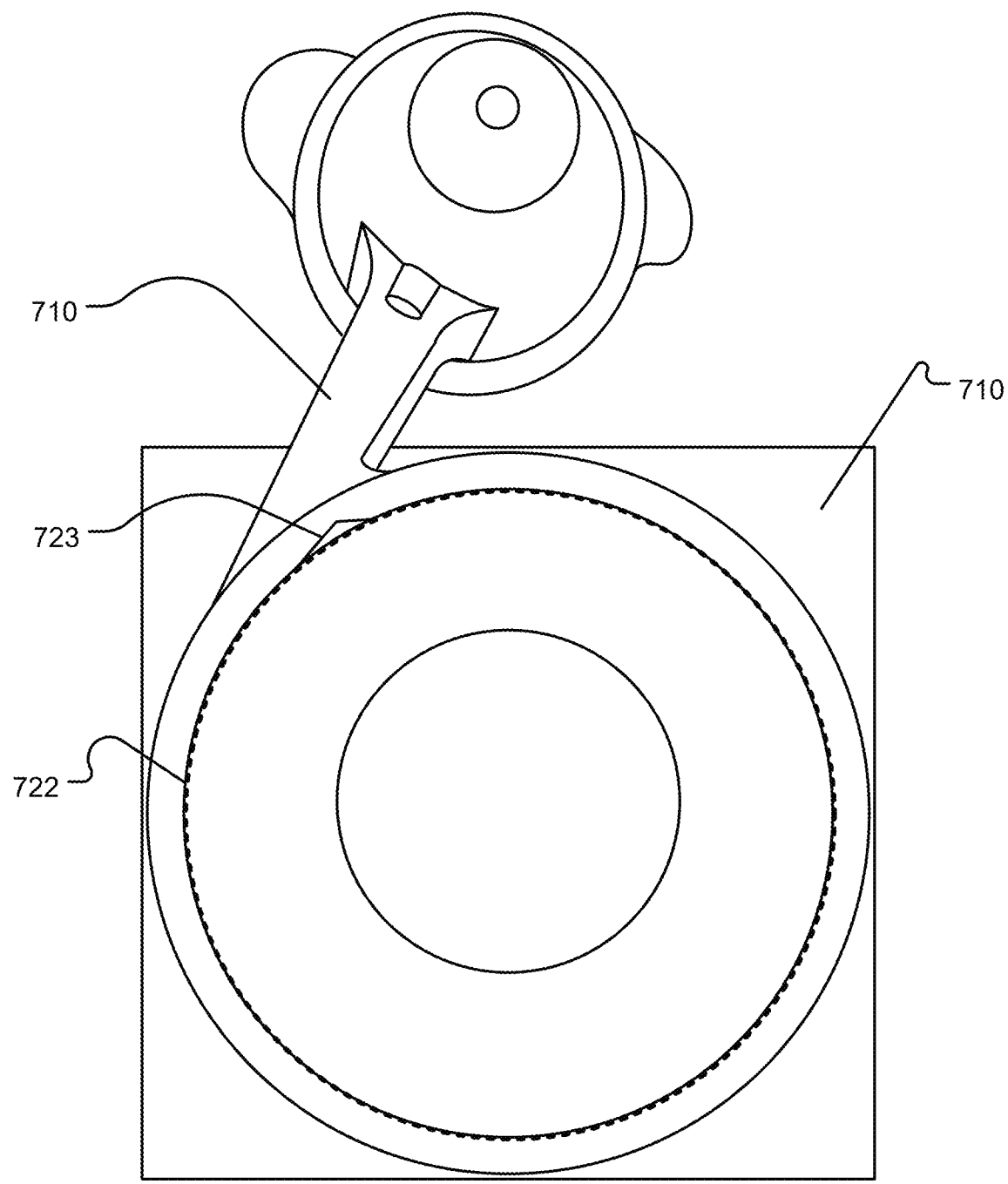
FIG. 8 illustrates a top view of an embodiment of a spout assembly component with a blade of a frozen confection machine in accordance with the teachings and principles of the disclosure.
Figure 9:
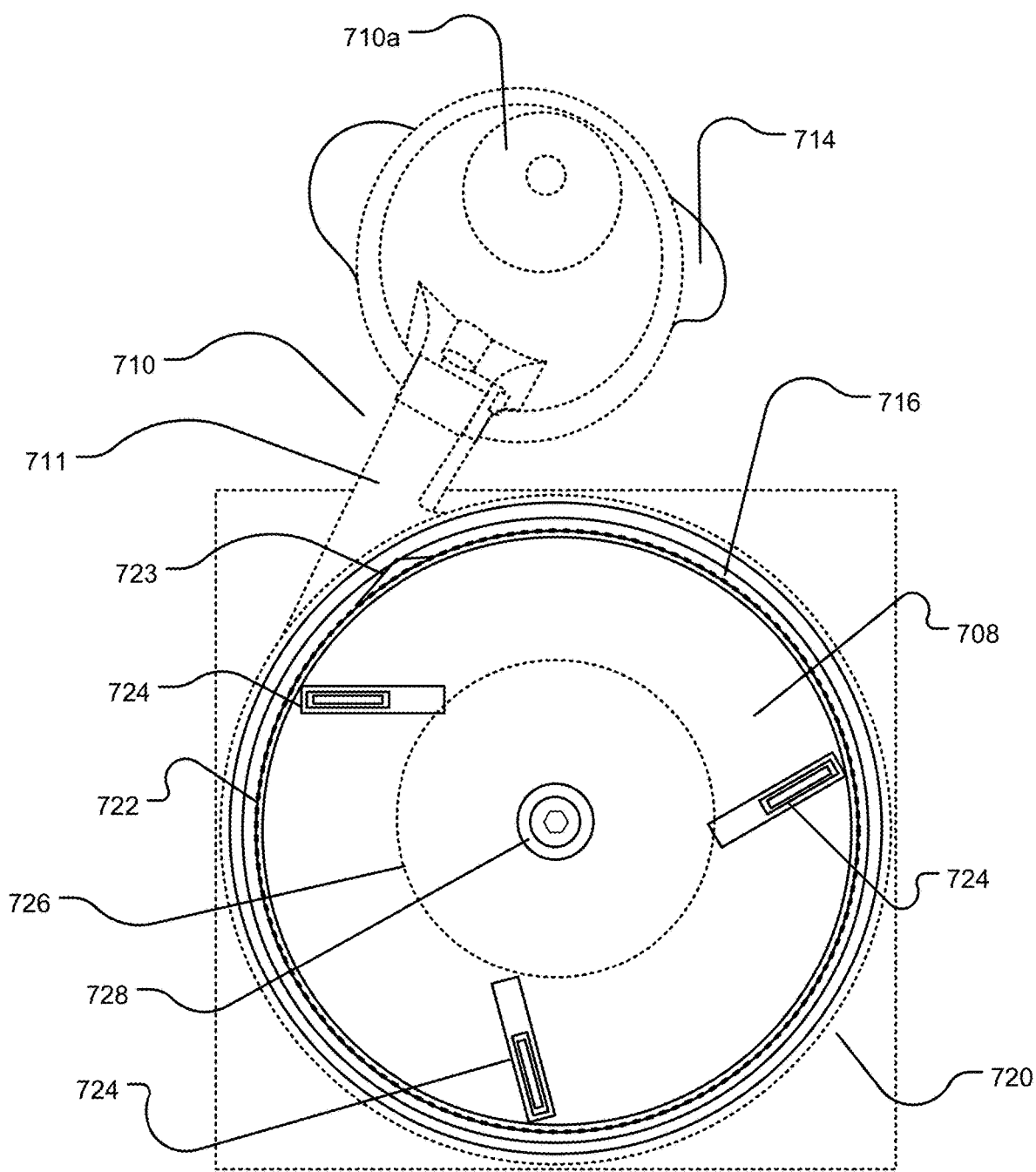
FIG. 9 illustrates a top view of an embodiment of spout assembly and a scraper assembly comprising a blade and a scraper of a frozen confection machine in accordance with the teachings and principles of the disclosure.

Referring now to FIGS. 8 and 9, there is illustrated a top view of an embodiment of the spout assembly 710 with the blade 722 of the frozen confection machine 700 illustrated as being attached thereto, and a top view of an embodiment of the spout assembly 710 and a scraper assembly 720 also illustrating the blade 722 being attached thereto and the scraper 708 of the frozen confection machine 700, respectively. As illustrated, the blade 722 may be attached to the spout assembly 710 using tabs (discussed more fully in connection with FIGS. 10 and 12). The blade 722 may be located or disposed within the cabinet 702 between the hopper 704 and the spout of the spout assembly 710 as illustrated.

The blade 722 may comprise an ice guide 723 that may operate in conjunction with a chute of the spout assembly 710 to assist in the exit of the shaved ice from the spout assembly 710. The ice guide 723 may operate to block or otherwise deter the ice from entering into unwanted portions of the spout assembly 710. The ice guide 723 may be made of the same or similar material as the blade 722 or the guide 723 may be made from a different material.

In FIG. 9, the spout assembly 710 may be made from a clear plastic material and, as such in this embodiment, the spout assembly 710 is illustrated in dashed lines. In addition to the spout assembly 710, FIG. 9 also illustrates the scraper assembly 720. In an embodiment, the blade 722 may be fixed in place in a circular slot 716 of the scraper 708 to provide consistent ice shaving (illustrated best in FIG. 9). The scraper 708 may comprise a plurality of paddles 724, which may operate to contact the ice and push the ice across the blade and collect the shavings. The scraper 708 may operate to continuously move the ice across the blade 722, freeing flakes or shavings of ice, which are received by the chute 711 and eventually the spout 710a of the spout assembly 710.

The spout assembly 710 may include an outer shell, which fits over and around the blade 722 as well as the scraper 708, and may further include an opening 726. Ice may be received through the opening 726 and is centrifugally drawn into contact with the blade 722 by the scraper 708. The scraper 708 may comprise a shaft head 728 for receiving the drive shaft of the motor. As illustrated, the paddles 724 of the scraper 708 may be positioned to drag the ice over and across the surface of the blade 722 in order to shave or condition the ice.

Figure 10:
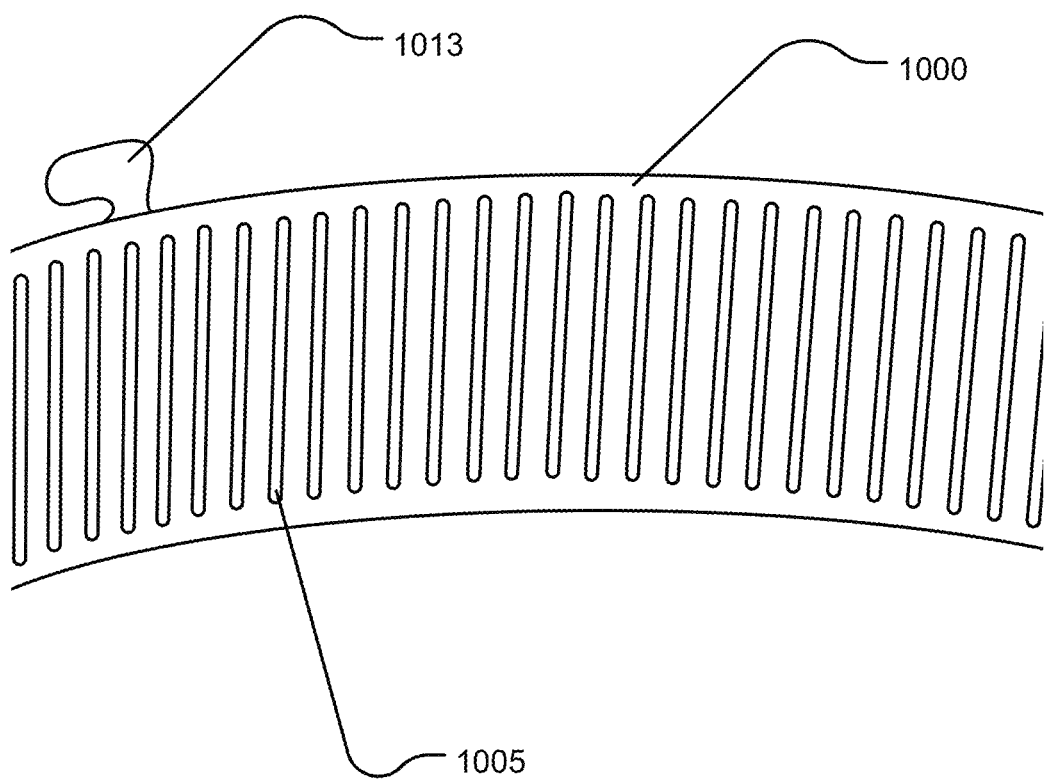
FIG. 10 illustrates a detailed view of the blade illustrated in FIG. 9 and made in accordance with the teachings and principles of the disclosure.

Referring now to FIG. 10, there is illustrated an embodiment of an arcuate blade. The arcuate blade 1000 may have a plurality of teeth 1005. The arcuate blade 1000 may be defined by an arc angle that defines the arc length of the blade. In an implementation, the arcuate blade 1000 may be defined by an arc angle having a range of angles between about 10 degrees and about 360 degrees. It should be noted that a band blade may also be an arcuate blade 1000 and may be defined by an arc angle of 360 degrees. Additionally, an arcuate blade 1000 may be a segment of a band blade that is defined by an arc angle. More specifically, an embodiment of an arcuate blade 1000 may be defined by an arc angle having a range of about 20 degrees to about 90 degrees. As also illustrated in the figure, an attachment tab 1013 may protrude from the arcuate blade 1000 in order to fix the blade 1000 relative to a housing, cabinet or spout assembly as described previously.

Figure 11:
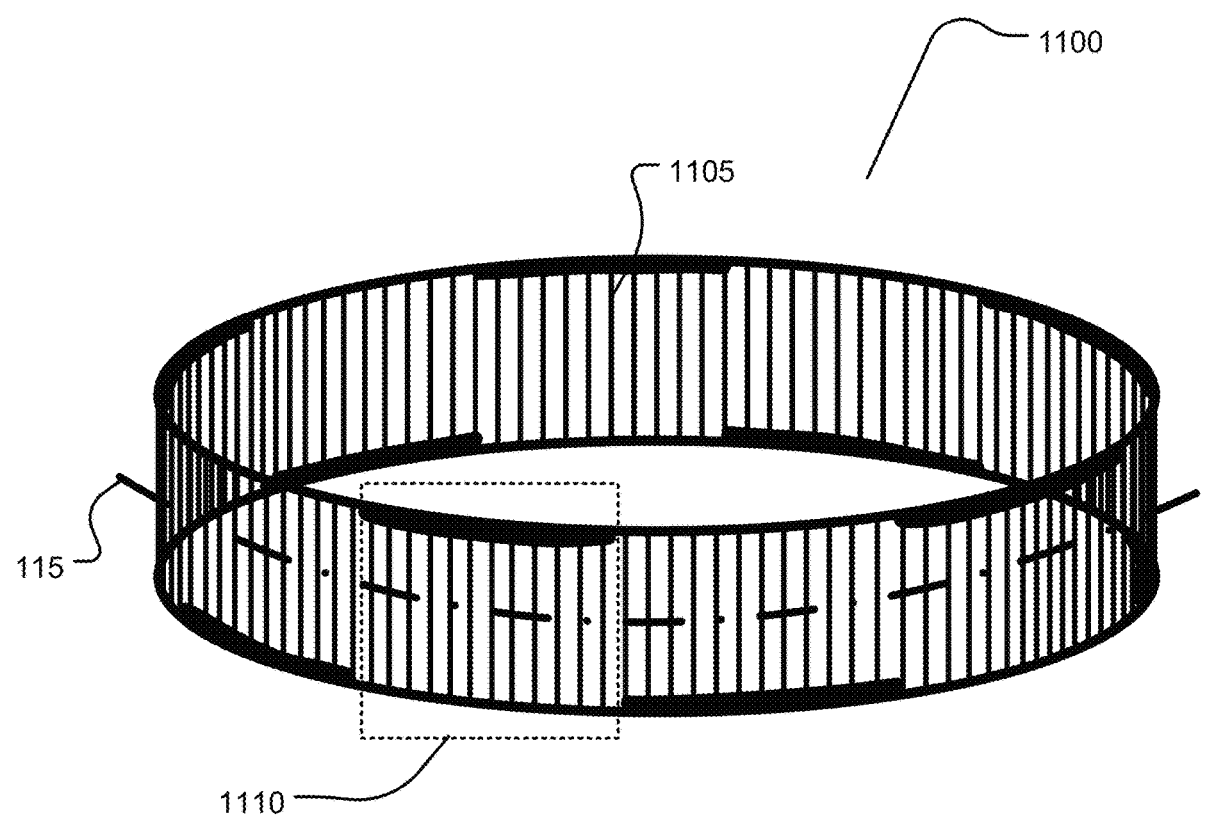
FIG. 11 illustrates an embodiment of a blade of a frozen confection machine in accordance with the teachings and principles of the disclosure.

FIG. 11 illustrates an embodiment of an arcuate blade having a repeating pattern of offset teeth. As can be seen in the figure, an embodiment of an arcuate blade 1100 may comprise a repeating pattern 1110 of a plurality of teeth or group of teeth 1105, with the teeth or group of teeth being offset as illustrated in the dashed box. In the present implementation, the pattern 1110 is illustrated as being ten teeth 1105 offset up relative to ten teeth 1105 being offset down. However, it will be appreciated that any number of teeth may be offset with respect to each other. In other words, each tooth may be offset relative to each other tooth, or a group of two or more teeth may be offset from another group of two or more teeth. Irrespective of the pattern, the offset may be defined from a center line 1115 of the arcuate blade 1100, or may be defined relative to other teeth 1105 in the arcuate blade 1100. It will be understood that any repeating offset pattern of teeth, or random offset between teeth 1105, is intended to fall within this disclosure. Additionally, although the figure only shows two off set positions, it is hereby intended to show an unlimited number of offset positions. Additionally, as can be seen in the figure, an arcuate blade 1100 may be defined by an arc angle that defines the arc length of the arcuate blade 1100. In an implementation, the arcuate blade 1100 may be defined by an arc angle of 360 degrees. It should be noted that a band blade may be an arcuate blade defined by an arc angle of 360 degrees.

In an embodiment, a pattern of alternating teeth and corresponding slots may be repeated along the arc length of the arcuate blade 1100. In an embodiment, a pattern of groups of alternating teeth and corresponding slots may be repeated along the arc length of the arcuate blade 1100.

Figure 12:
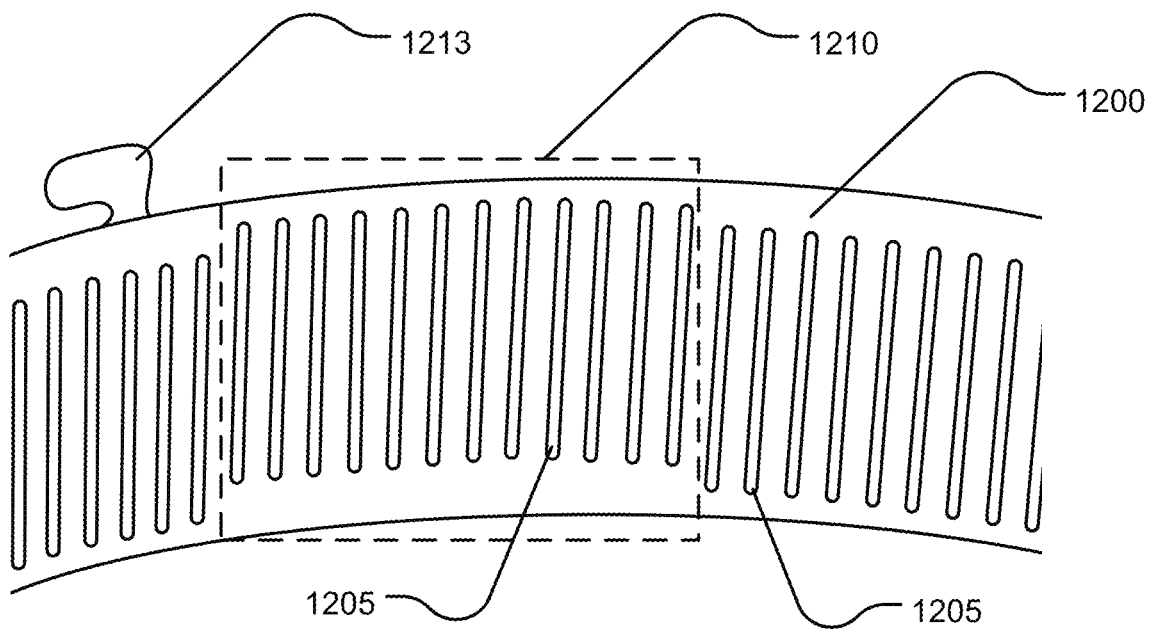
FIG. 12 illustrates a detailed view of the blade illustrated in FIG. 11 and made in accordance with the teachings and principles of the disclosure.

Referring now to FIG. 12, there is illustrated an embodiment of an arcuate blade having a repeating or alternating pattern of offset teeth. As can be seen in the figure, an embodiment of an arcuate blade 1200 may comprise a repeating pattern 1210 of teeth 1205 offset as illustrated in the dashed box. In the present implementation, the pattern 1210 is twelve teeth 1205 offset up relative to 12 teeth 1205 offset down. The offset may be defined from a center line of the arcuate blade 1200, or may be defined relative to other teeth 1205 in the arcuate blade 1200. Any repeating offset pattern of teeth, or random offset between teeth 1205, is intended to fall within this disclosure. Additionally, although the figure only shows two off set positions, it is hereby intended to show an unlimited number of offset positions. As also illustrated in the figure, an attachment tab 1213 may protrude from the arcuate blade in order to fix the blade relative to a housing or spout assembly (not shown).

Figure 13:
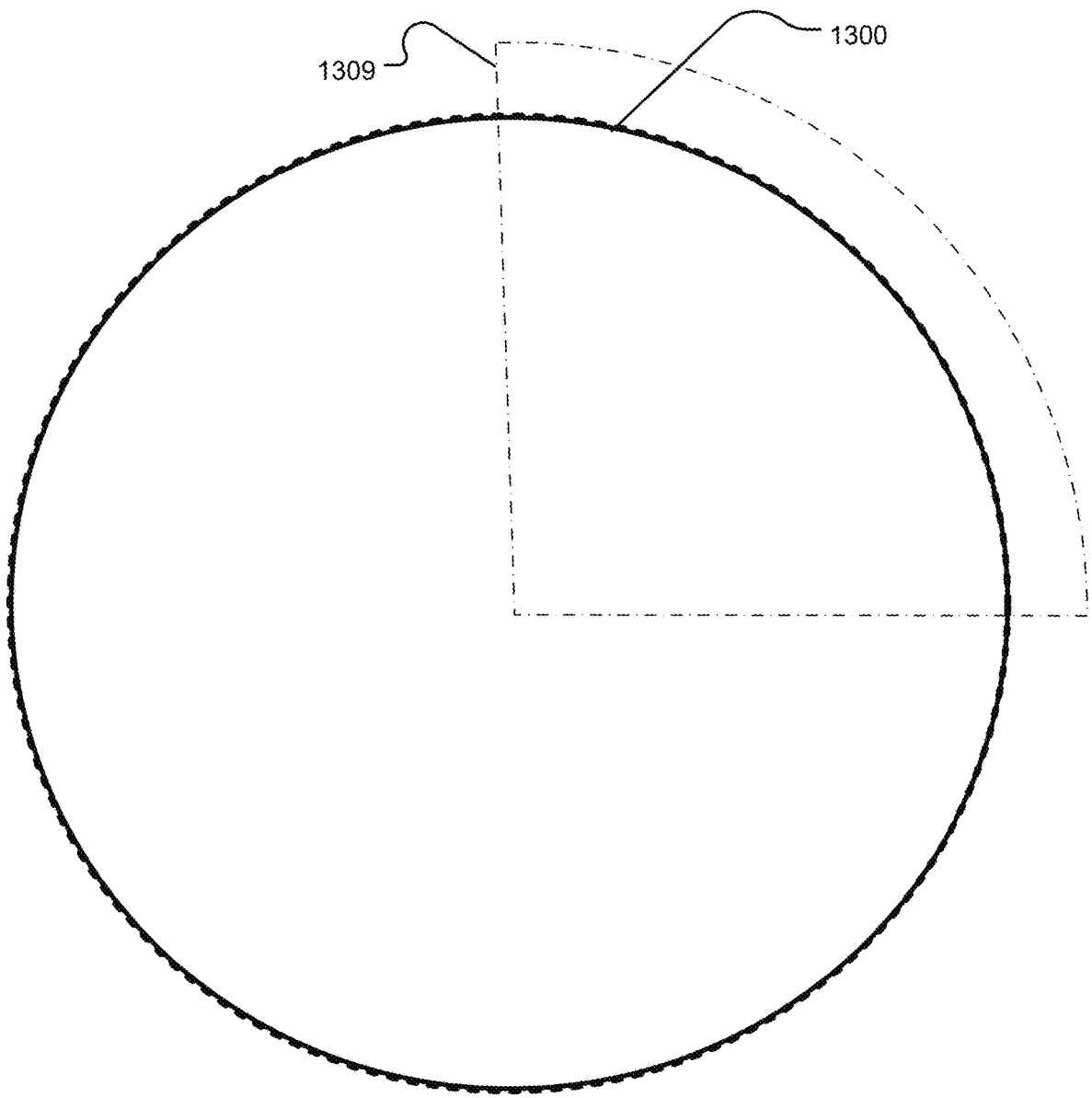
FIG. 13 illustrates a top view of an arcuate blade of a frozen confection machine in accordance with the teachings and principles of the disclosure.

FIG. 13 illustrates a top view of an embodiment of an arcuate blade. As can be seen in the figure, an arcuate blade 1300 may be defined by an arc angle 1309 that defines the arc length of the arcuate blade 1300. In an implementation the arcuate blade 1300 may be defined by an arc angle 1309 having a range of about 10 degrees to about 360 degrees. It should be noted that a band blade may be defined by an arc angle of 360 degrees. Additionally, an arcuate blade 1300 may be a segment of a band blade that is defined by an arc angle 1309. More specifically, an embodiment of an arcuate blade 1300 may be defined by an arc angle having a range of about 20 degrees to about 90 degrees. In an embodiment a pattern of alternating teeth and corresponding slots may be repeated along the arc length of the arcuate blade 1300.

It will be appreciated that the foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

It should be noted that embodiments shown in the figures and described herein are intended to be exemplary and that any variations in the size and the relative proportions of the individual components fall within the scope of this disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A system for shaving ice comprising:
    a cabinet;
    a hopper attached to said cabinet;
    a drive motor disposed within said cabinet;
    a stationary arcuate blade fixed relative to said cabinet, the blade comprising a plurality of slots adjacent to a plurality of corresponding teeth, wherein at least one of the plurality of corresponding teeth are offset relative to the plurality of corresponding teeth and offset relative to a centerline of the arcuate blade, wherein the centerline of the arcuate blade intersects each of the plurality of slots along an arc of the arcuate blade;
    a control mechanism for activating and deactivating said drive motor;
    a spout configured for dispensing conditioned ice; and
    a scraper mechanically connected to said drive motor, such that when said drive motor is activated, the scraper rotates and scrapes ice against said arcuate blade thereby conditioning the ice.

2. The system of claim 1, wherein each of the plurality of teeth are offset relative to each other.

3. The system of claim 1, wherein the plurality of teeth are offset in an alternating pattern.

4. The system of claim 1, further comprising a lid configured for covering a hopper portion.

5. The system of claim 4, wherein the lid has a transparent portion.

6. The system of claim 1, further comprising a flexible shaping flap that is attached near the spout.

7. The system of claim 1, wherein the scraper further comprises a plurality of paddles for moving ice into the blade.

8. The system of claim 1, wherein the arcuate blade has an arc angle that is selected from a range of about 10 degrees to about 360 degrees.

9. The system of claim 8, wherein the arcuate blade has an arc angle that is selected from the range of about 20 degrees to 90 degrees.

10. The system of claim 1, wherein the arcuate blade is a band blade.

11. The system of claim 1, wherein the arcuate blade is disposed within the cabinet and between the hopper and the spout.

12. A scraper assembly for conditioning ice comprising:
    a stationary arcuate blade comprising a plurality of slots adjacent to a plurality of corresponding teeth, wherein at least one of the plurality of corresponding teeth are offset relative to the plurality of corresponding teeth and offset relative to a centerline of the arcuate blade is parallel to an arc of the arcuate blade and, wherein the centerline of the arcuate blade intersects each of the plurality of slots;
    a scraper configured to rotate relative to said arcuate blade, such that when said scraper is activated the scraper rotates and scrapes ice against said arcuate blade thereby conditioning the ice.

13. The scraper assembly of claim 12, wherein each of the plurality of teeth are offset relative to each other.

14. The scraper assembly of claim 12, wherein the plurality of teeth are offset in an alternating pattern.

15. The scraper assembly of claim 14, wherein the alternating pattern repeats along the arcuate blade length.

16. The scraper assembly of claim 12, wherein the scraper comprises a paddle for moving ice into the blade.

17. The scraper assembly of claim 16, wherein the paddle is radially placed on the scraper.

18. The scraper assembly of claim 12, wherein the scraper further comprises a plurality of paddles for moving ice into the blade.

19. The scraper assembly of claim 12, wherein the arcuate blade has an arc angle that is selected from a range of about 10 degrees to about 360 degrees.

20. The scraper assembly of claim 19, wherein the arcuate blade has an arc angle that is selected from the range of about 20 degrees to 90 degrees.

21. The scraper assembly of claim 12, wherein the arcuate blade is a band blade.

* * * * *